May 31, 1949.　　　N. D. COGGESHALL ET AL　　　2,471,935
METHOD AND APPARATUS FOR SEPARATING CHARGED
PARTICLES OF DIFFERENT MASSES
Filed March 19, 1945　　　　　　　　　　　　10 Sheets-Sheet 1

Inventors
NORMAN D. COGGESHALL
MORRIS MUSKAT

By G. M. Houghton
their Attorney

May 31, 1949.　　　　N. D. COGGESHALL ET AL　　　　2,471,935
METHOD AND APPARATUS FOR SEPARATING CHARGED
PARTICLES OF DIFFERENT MASSES
Filed March 19, 1945　　　　　　　　　　　　　　10 Sheets-Sheet 2

Inventors
NORMAN D. COGGESHALL
MORRIS MUSKAT

By G. M. Houghton
their Attorney

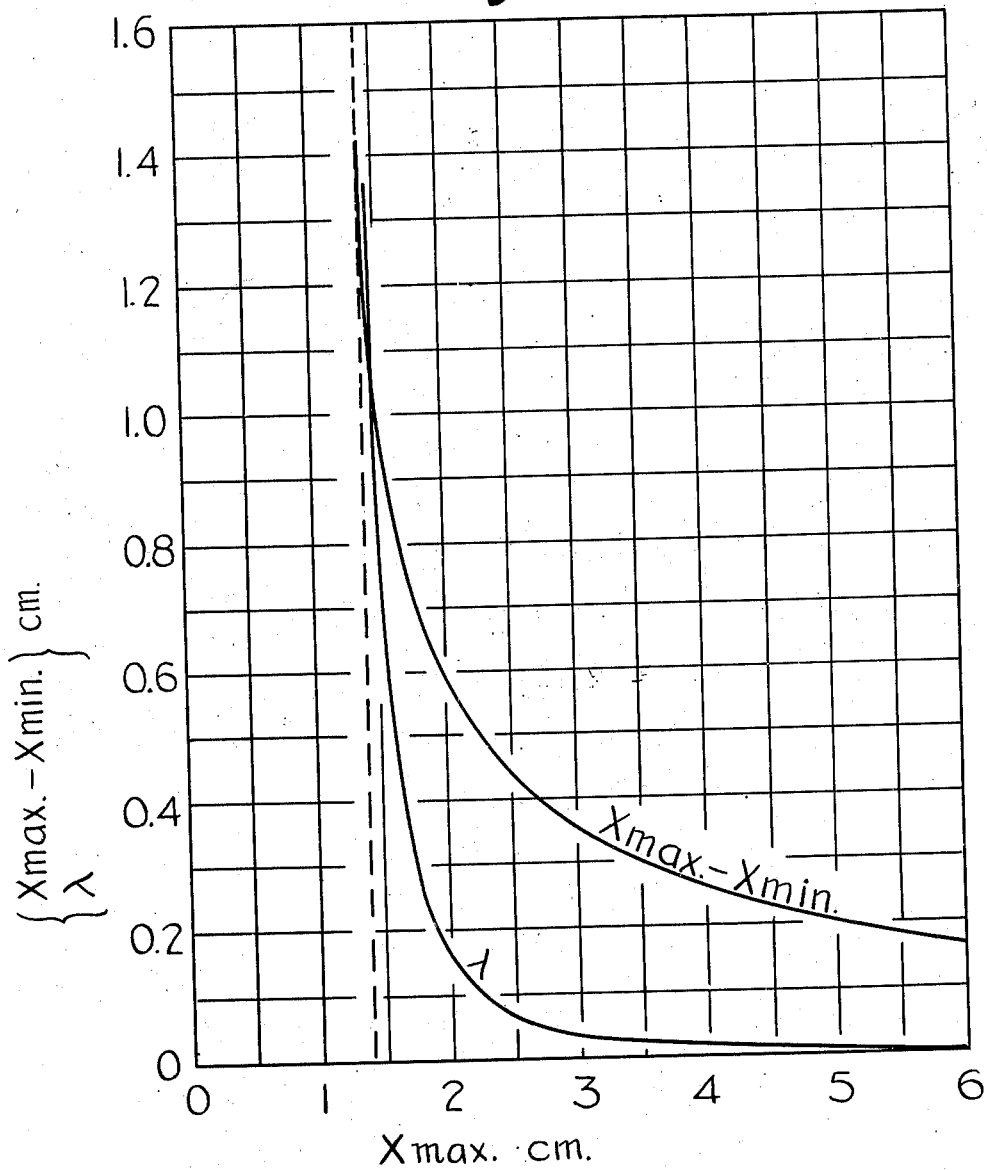

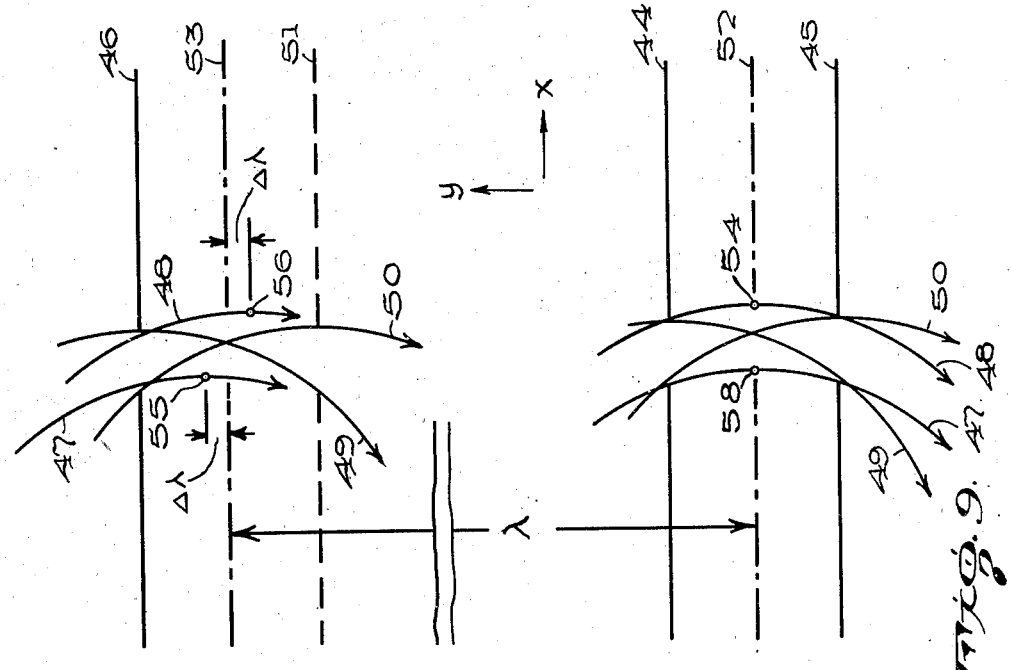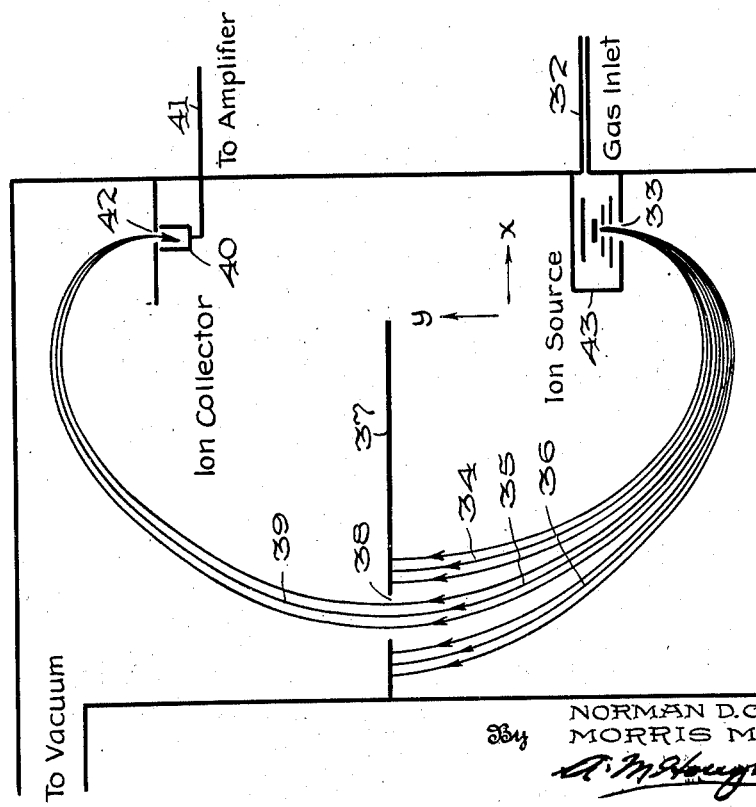

May 31, 1949.    N. D. COGGESHALL ET AL    2,471,935
METHOD AND APPARATUS FOR SEPARATING CHARGED
PARTICLES OF DIFFERENT MASSES
Filed March 19, 1945    10 Sheets-Sheet 7
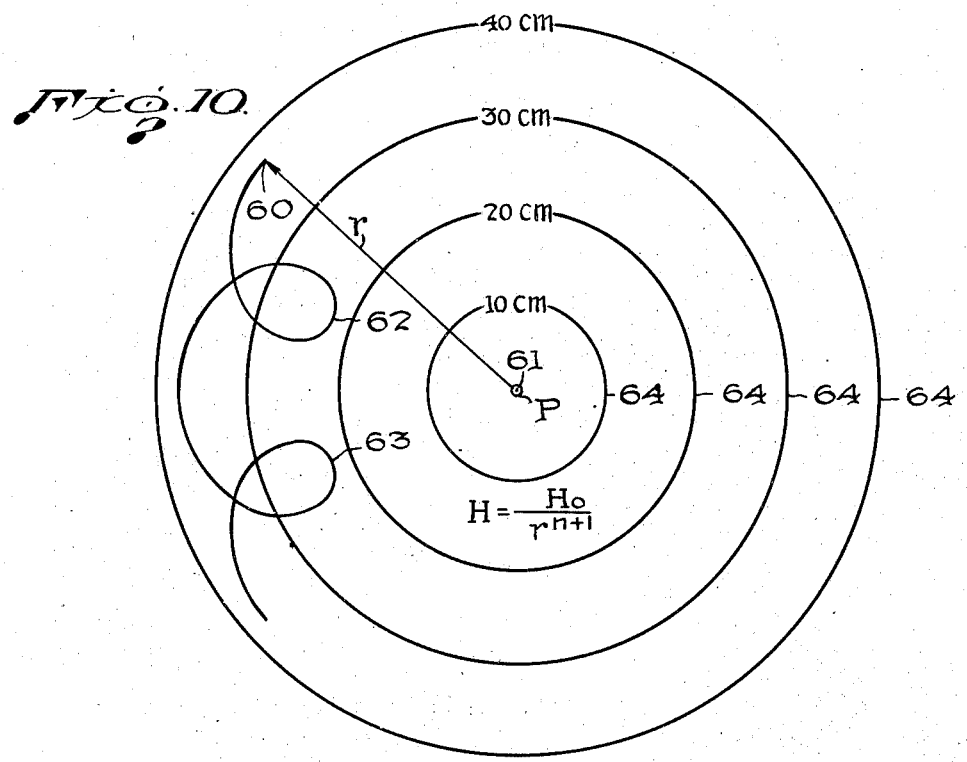
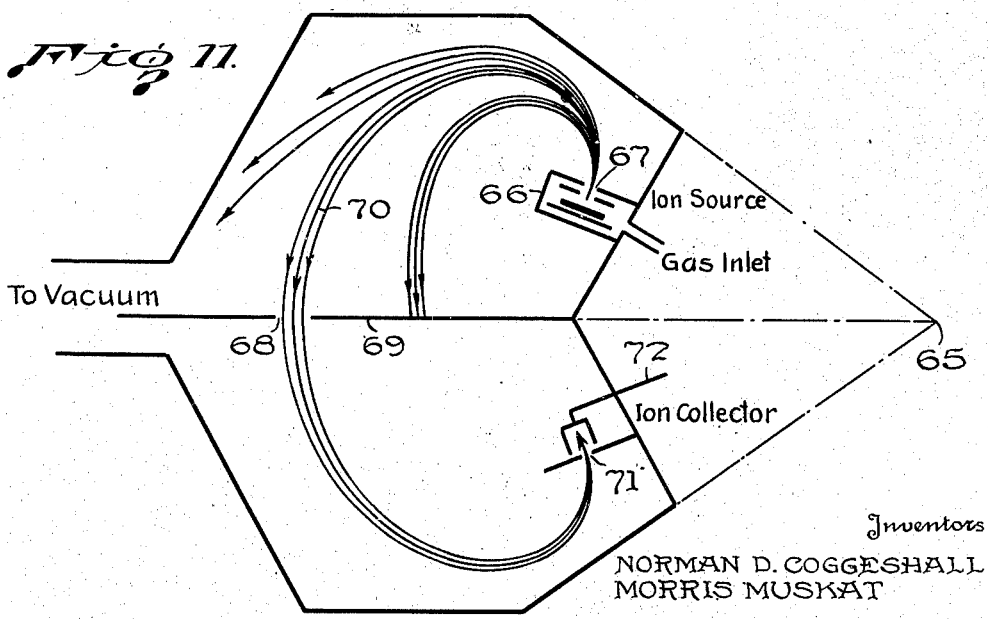
Inventors
NORMAN D. COGGESHALL
MORRIS MUSKAT
By A. M. Houghton
their Attorney

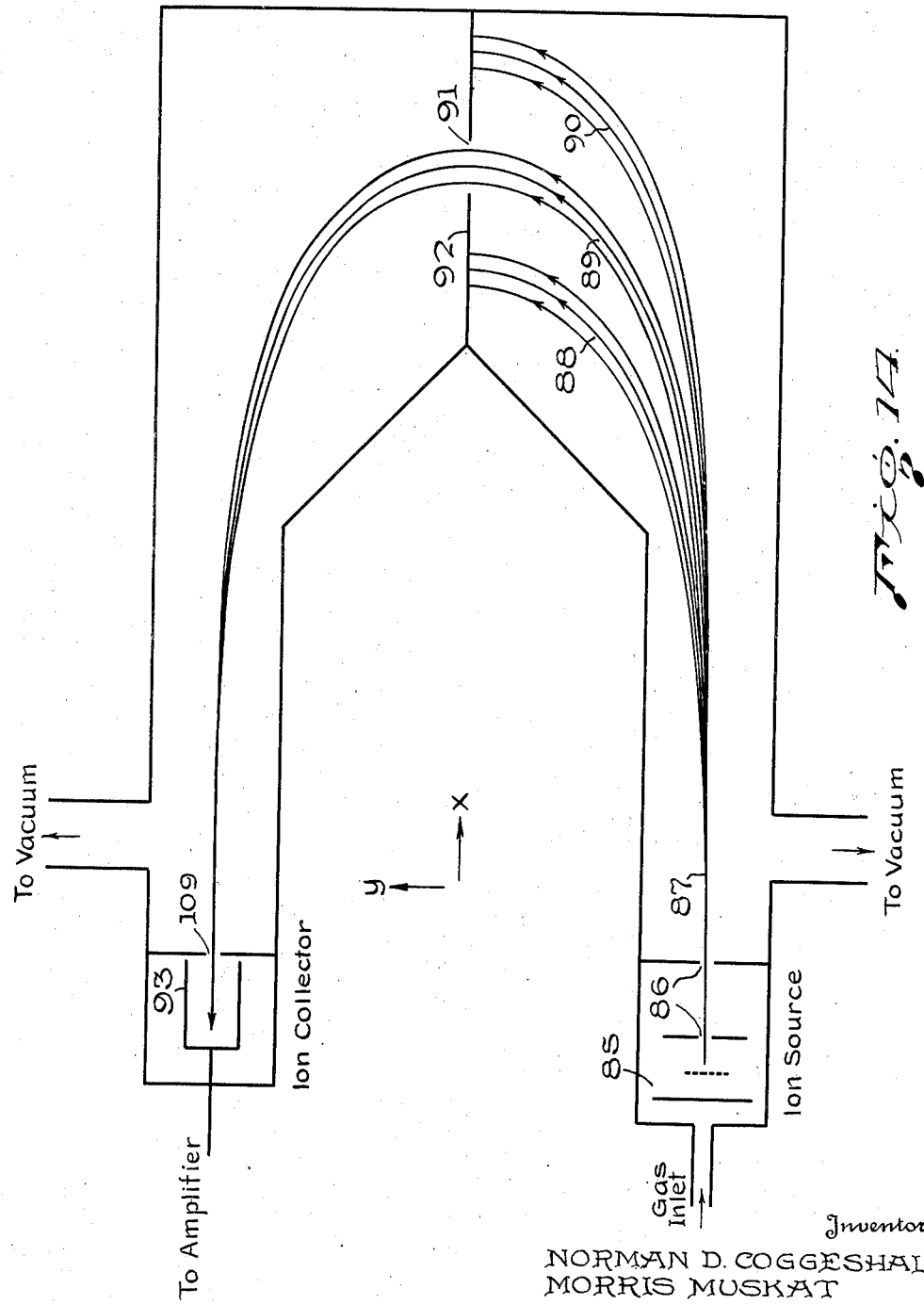

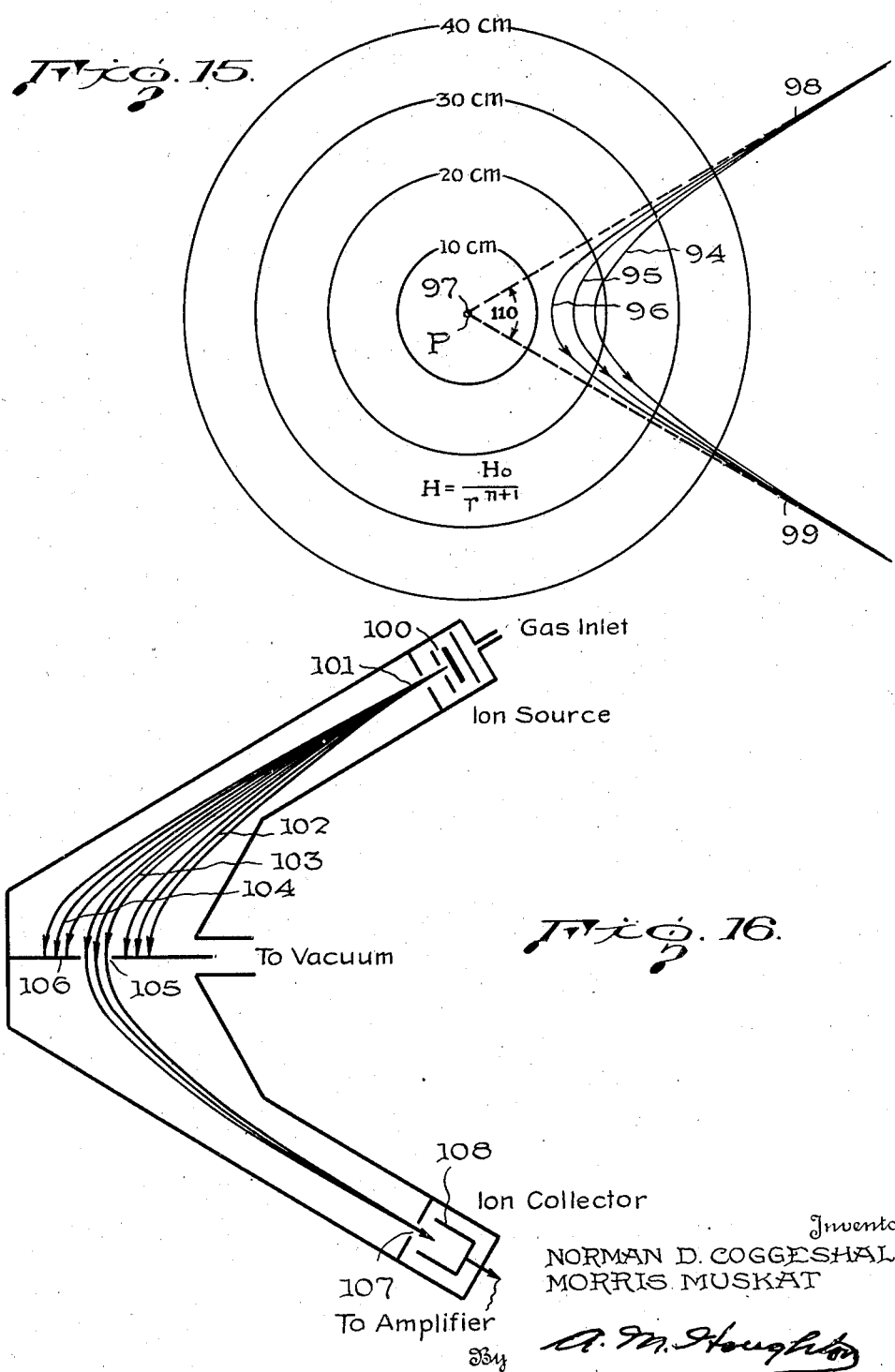

Patented May 31, 1949

2,471,935

UNITED STATES PATENT OFFICE 2,471,935

METHOD AND APPARATUS FOR SEPARATING CHARGED PARTICLES OF DIFFERENT MASSES

Norman D. Coggeshall, O'Hara Township, Allegheny County, and Morris Muskat, Oakmont, Pa., assignors to Gulf Research & Development Company, Pittsburgh, Pa., a corporation of Delaware Application March 19, 1945, Serial No. 583,432

26 Claims. (Cl. 250—41.9)

1

This invention concerns a new and improved method of focusing electrically charged particles and more particularly a method and apparatus for ion focusing in a mass spectrometer. The invention may be utilized either for space focusing or for momentum focusing, and depends for its operation on the motion of an electrically charged particle in a non-homogeneous field of a special type.

In the last two decades there have been great advancements in the application of magnetic fields for the focusing of electrons and ions. Among instruments using magnetic lenses are: mass spectrographs, mass spectrometers, beta-ray spectrometers, isotope separators, electron microscopes, electron diffraction apparatus, electron scattering apparatus, and television equipment. A discussion of the history of the application of magnetic lenses for the study of isotopes may be found in an article, "A short history of isotopes and their measurement," by E. B. Jordan and L. B. Young (Journal of Applied Physics, vol. 13, p. 526, Sept. 1942). In these applications the action of the magnetic field is to so deflect a diverging beam of electrons or ions as to cause it to converge or come to a focus.

The mass spectrometer has been used extensively for the separation of gaseous ions. As an analytical tool, it is able to separately determine constituents not separable by ordinary chemical means. It may be used to determine isotopic concentrations or to determine the concentrations of isomers in complicated chemical materials. Essentially, it separates ions according to their mass/charge ratio and permits measuring the amount of each type of ion present. The material to be analyzed is ionized in the instrument and the ions are separated by the action of electric or magnetic fields or both either successively or simultaneously. Ordinarily the material is introduced into the ion source as a gas at low pressure, and the rest of the apparatus is maintained under high vacuum so that the ions meet no obstacles in their path. In most recent instruments the ions are produced by electron impact and accelerated by electric fields in an "ion gun," from which they are projected into a region of magnetic field in a direction at right angles to the lines of force. Ions having different momenta execute different orbits in the magnetic field and the groups of ions are caught at appropriate places.

It is well known that ions moving in a uniform homogeneous magnetic field at right angles to the lines of force will move in circular arcs. Homogeneous and uniform magnetic fields have been employed in various arrangements designed for mass spectrometers to be used for various purposes. The function of the magnetic field in each case is to reunite or focus particles of a divergent ion beam and at the same time permit sorting them according to their mass/charge ratio.

It is the purpose of this invention to provide several new focusing arrangements with distinct advantages over the ones heretofore in use. In the practice of the heretofore known art, it is customary to use the focusing properties of uniform and homogeneous magnetic fields, and the presence of an inhomogeneity is undesirable and usually harmful. In the focusing arrangements provided by this invention, the magnetic field is deliberately made non-homogeneous, and advantage is taken of paths of ions or electrons in such a non-homogeneous field to achieve proper focusing.

It is accordingly an object of this invention to provide a method and apparatus for more perfect space focusing of charged particles.

Another object of this invention is to provide a method and apparatus for space focusing of charged particles by means of a non-homogeneous magnetic field.

Another object of this invention is to provide a method and apparatus for momentum focusing of charged particles.

Another object of this invention is to provide a method and apparatus for momentum focusing of charged particles by means of a non-homogeneous magnetic field.

A further object of this invention is to provide a method and apparatus whereby improved ion sorting is achieved in a mass spectrometer.

The manner of accomplishing these and other objects are made apparent in the following specification, of which the drawings also form a part, and in which:

Figure 7 is a graph showing the relation between certain parameters of a orbit executed by a charged particle in an inhomogeneous field as used in our invention.

Figure 8 is a diagram of a mass spectrometer utilizing a magnetic field of one-dimensional (Cartesian) inhomogeneity.

Figure 9 is an enlarged view of the source and collector slits of Figure 8 showing how space focusing takes place.

Figure 10 shows a type of ion path which may be obtained in a magnetic field having axial symmetry.

Figure 11 is a diagram of a mass spectrometer utilizing a magnetic field having axial symmetry.

Figure 14 is a diagram of a mass spectrometer utilizing the special type of ion path shown in Figure 13.

Figure 15 shows another special type of ion path which may be obtained in a magnetic field having axial symmetry.

Figure 16 is a diagram of a mass spectrometer utilizing the special type of ion path shown in Figure 15.

Figure 1:
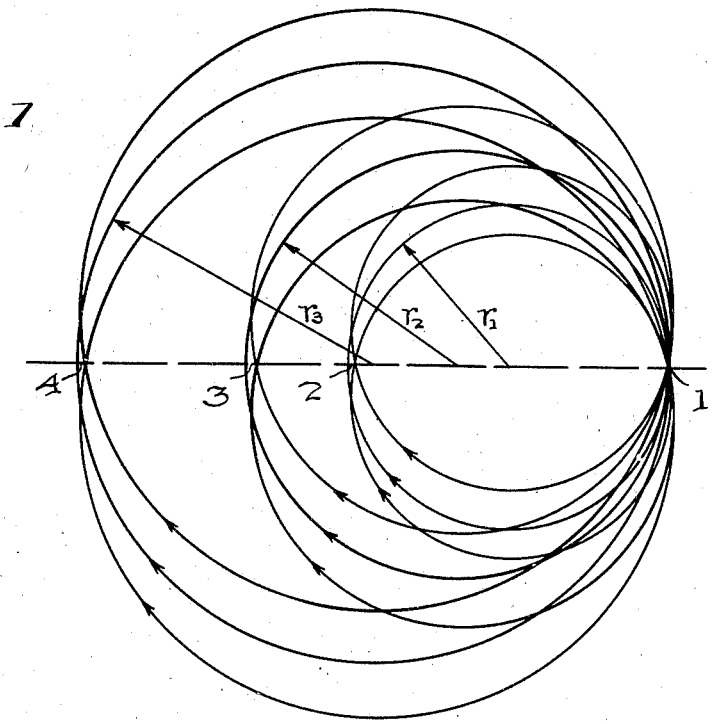
Figure 1 is a diagram of the ion paths in a mass spectrometer having a homogeneous field as heretofore used.
Figure 2:
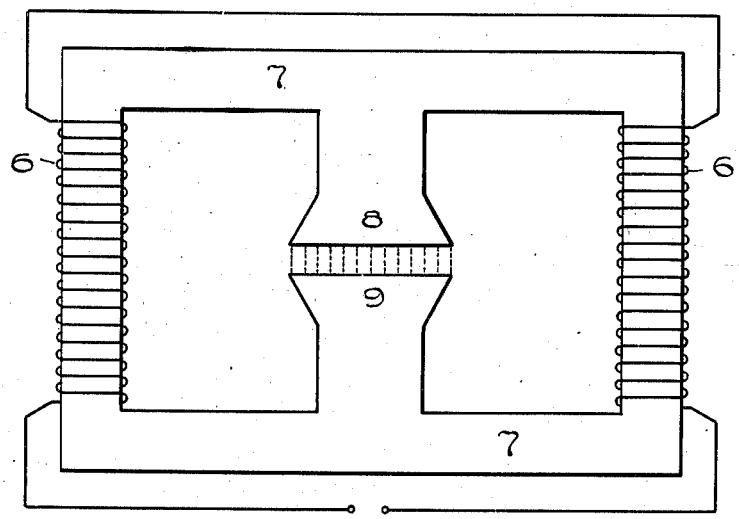
Figure 2 is a diagram of a magnet which produces the type of homogeneous field heretofore used in mass spectrometers.

When a charged particle moves in the presence of and perpendicular to a magnetic field and in the absence of an electric field it will move along the arc of a circle. The radius of curvature of the arc depends upon the mass of the particle, its kinetic energy, and upon the strength of the magnetic field. If the magnetic field is constant and if a number of ions of the same kinetic energy but different masses (i. e. different momenta) move in the field they will move along circles of different radii. One method in which this fact is used to achieve focusing of electrons or ions is illustrated in Figure 1 of the drawings. Here point 1 represents the location of a source of ions. A uniform magnetic field is directed normal to the plane of Figure 1. Such a field may be obtained by means of an electromagnet shown in Figure 2. A direct current is passed through coils 6 magnetizing yoke 7 so that a uniform and homogeneous flux is set up in the air gap between pole pieces 8 and 9. The mass spectrometer apparatus is placed in the air gap in such a way that ions will move in a plane normal to the uniformly distributed lines of force. An attempt is made to project the ion beams from point 1 (Figure 1) with practically the same kinetic energy. If there are three different types of ions issuing from the source at point 1 (Figure 1), i. e., having three different masses, they will execute paths of three different radii, shown as $r_1$, $r_2$ and $r_3$. There will be an angular spread of the paths because of the space divergence of the ion beam. As may be seen from the figure, there is a "semi-focusing" of the separate groups of ions at points 2, 3 and 4. Although the ion beams are perfectly focused in returning to 1, it is not feasible to exploit this fact in an actual instrument because of the practical difficulty of locating both a source and collector of ions at the same point 1. A quite common application of the focusing illustrated in Figure 1 is to utilize the "semi-focusing" points 2, 3 or 4. That is, an ion source is located at 1 and a collector at one or more such points as 2, 3 or 4. As may be seen, this is far from ideal, because the collector for the ions is not at the point of best focusing. This leads to difficulty in getting the desired resolution between ion beams. High resolution is required to separate ion beams of large masses.

Other applications of uniform magnetic fields for the focusing of ion beams may be found in the article by Jordan et al. mentioned above. In none of them is it possible to use such a point of perfect focusing as the point 1 in Figure 1 and an imperfect semi-focusing is used instead. In this invention we shall describe how it is possible to obtain points of perfect focusing for application in focusing instruments by using non-homogeneous magnetic fields.

In the mass spectrometers in general use today a beam of ions is created by drawing out from the ionization region the ions formed by electron impact. This is accomplished by the application of electric fields, and the ions emerge from the final slit of the ion source in the form of a ribbon. The ribbon surface of the emerging ribbon-like beam is always parallel to the direction of the magnetic field used for focusing so that the ions travel normal to the field. It is impossible, however, to obtain a ribbon of emerging ions in which their directions of travel are strictly parallel. Instead, there will be an angular spread such that some ions will be diverging or travelling away on both sides from the central part of the ribbon. It is the purpose of the focusing element of the spectrometer, usually a magnetic lens, to cause ions of diffrent momentum in the beam to travel in different paths, and, at the same time, to cause the diverging ions of any one momentum later to converge at a "focal point." This is termed space focusing or angular focusing.

In actual ion beams there will be several momentum classes, each corresponding to a fixed ion mass, but there will also be a momentum spread due to the ions created at different points of electrostatic potential in the ionization region. When the ions being studied are caused by dissociation and ionization of polyatomic molecules, there results a rather large momentum spread from this cause. This is due to the fact that in such processes there is a considerable variation in the kinetic energy with which the ions may be formed. In cases where the ions are formed with little or no kinetic energy, almost all of the ions of a particular mass can be collected with one setting of the accelerating voltage. That is, the focusing at the collector slit is sufficient to collect practically all of the ions, with the rather large collector slit opening used (as compared with the source slit opening). However, when the ions are formed with considerable variation in kinetic energy, there results a considerable spread in momentum, and the ions in the beam do not converge enough to fall entirely within the dimensions of the collector slit. This results in a broadening and change of shape of the peak when the ion current is plotted against accelerating voltage, and introduces an uncertainty in the measured intensity of the beam. In analytical uses of a mass spectrometer the intensity of any particular ion beam is a quantity of paramount importance, and must be subject to determination with high precision.

Up to the present, all of the focusing schemes now in use depend upon a semi-perfect focusing of diverging ion beams, and in all of them a spread of momentum causes a superposed blurring of the focusing. In one form of this invention perfect angular focusing is obtained. In another form of this invention the momentum blurring is avoided and the effect produced is termed momentum focusing.

To illustrate our invention we shall describe several new and different focusing schemes. In two of them, utilizing periodic ion orbits, the momentum blurring is not removed, but the angular focusing is more nearly perfect than in existing instruments. In these instruments, therefore, the collector slit can be made smaller, with greater resultant resolution. In the other two schemes, utilizing aperiodic orbits, there is no angular focusing, but a new focusing principle is applied. This is momentum focusing. In the instruments in which such momentum focusing is achieved, the angular spread is closely controlled by using a narrower slit system in the ion source. However, ions of different momentum values passing out of the exit slits are focused into a single collector slit.

The difference between the application of angular and momentum focusing may be stated as follows: In the former (angular focusing) ions of the same momentum value, but different angles of emergence from the source slit, are focused into a single collector slit; in the latter (momentum focusing) ions with the same direction of emergence but with different momentum values are focused into a single collector slit.

An important advantage of our described instruments using periodic orbits and providing angular focusing is increased resolution. At present, mass spectrometers in use for analytical work are usually limited to ions of atomic mass of 150 or less. In analyzing organic mixtures, ions of greater atomic mass are often encountered, and for analytical work on these greater resolution is necessary.

Figure 3:
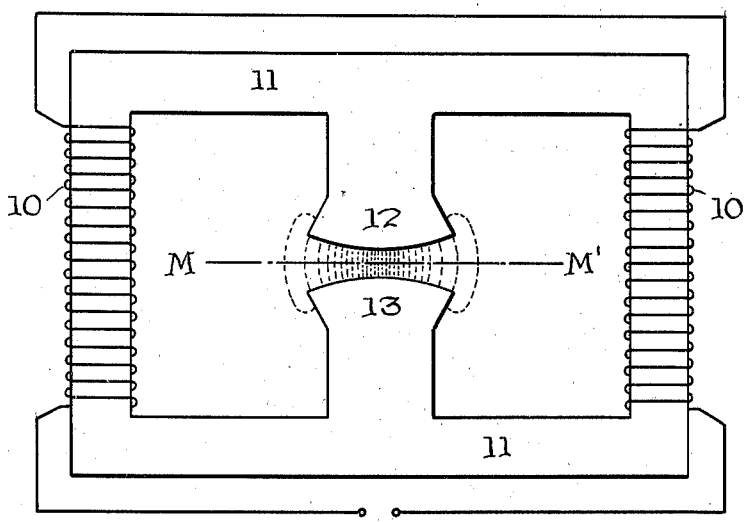
Figure 3 is a diagram of a magnet which may be used for producing a non-homogeneous field.

In considering the actual non-uniform magnetic field used in our invention, reference is made to the magnetic field due to the magnet shown schematically in Figure 3. This is similar to Figure 2 except in the shape of the pole pieces. An electric potential difference applied between the terminals gives rise to a current flowing through the wire coils 10 of the electromagnet. The iron yoke 11 is magnetized so that there is a magnetic field between the two pole pieces 12 and 13. The pole pieces are geometrically symmetrical with reference to the median plane MM' so that the magnetic flux lines (shown as dashed curves) will also be symmetrical with respect to it. As a consequence, the vector representing the magnetic field intensity at any point on the plane MM' will be perpendicular to it. This means that all the magnetic flux lines are parallel as they intersect the plane MM' so that the magnetic field is uniform in direction and its magnitude at any point on the plane can be expressed as a function of the position of the point on plane MM'. For pole pieces of axial symmetry we will thus have magnetic fields which are expressible as $H=H_0(r)$ on the median plane, where $r$ is the radial distance from the axis of symmetry. For pole pieces having a rectangular cross section with a relatively long dimension in the direction perpendicular to the plane of Figure 3 the fields may be described on the median plane in Cartesian coordinates as $H=H_0(x)$ where $x$ is the coordinate measuring the distance right and left on the plane MM' in Figure 3; the field in this case being invariant in the direction $y$ which is normal to the plane of Figure 3.

Figure 4:
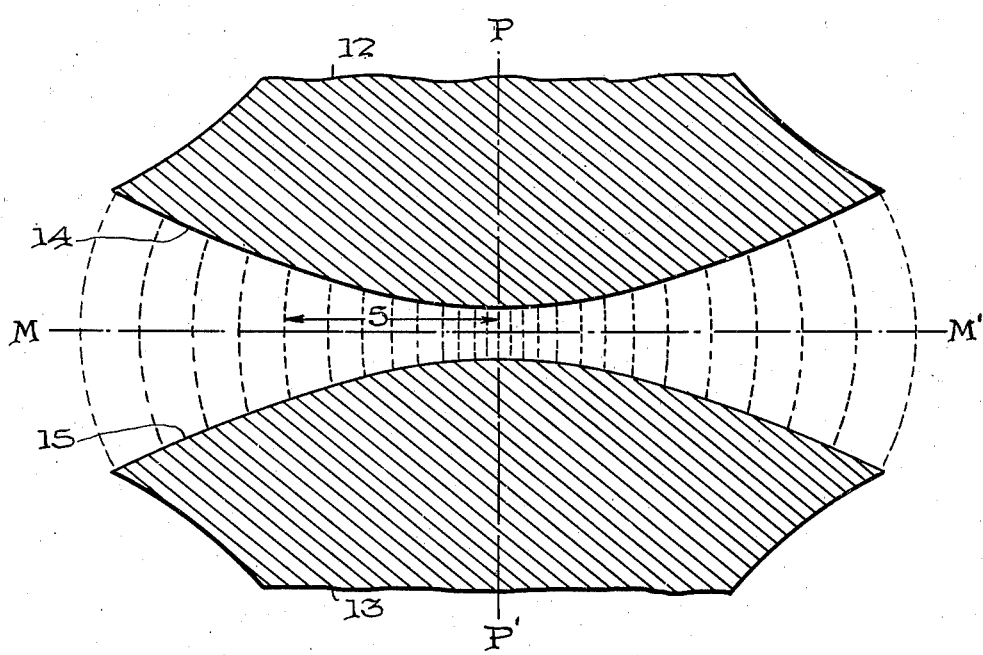
Figure 4 is an enlarged view of the magnet pole pieces which may be used.

In Figure 4 we have shown an enlarged view of the pole pieces 12 and 13. There is symmetry about the plane MM', and the field is everywhere normal to this plane. To obtain a field having axial symmetry, the figure is rotated about an axis PP', and the resulting field may be expressed by $H=H_0(r)$ where $r$ is the distance from axis PP'. To obtain a field having one-dimensional (Cartesian) inhomogeneity, the figure is extended parallel to itself in a direction normal to the figure, and the resulting field may be expressed by $H=H_0(x)$ where $x$ is the distance right or left from a plane PP'. The coordinate 5 in Figure 4 will be $r$ or $x$ respectively in these two cases.

The manner in which the field H varies with $r$ or $x$ respectively in the above two cases may be controlled by the shape of the pole surfaces 14 and 15 of the pole pieces 12 and 13. The required shape of these surfaces may be computed or determined empirically to obtain the desired variation of H in the plane MM'. The mass spectrometer apparatus is then placed in the gap between the pole faces 14 and 15 in such a way that the ion beams emerging from the ion source will be in or parallel to the plane MM'. The ions will execute paths or orbits in or parallel to the plane MM' as a result of the magnetic field, and the trajectories may be best pictured by a plot in the plane MM' itself.

The full mathematical theory of the motion of charged particles in magnetic fields of the type used in our invention is given in an article titled "The paths of ions and electrons in non-uniform magnetic fields" by N. D. Coggeshall and M. Muskat in The Physical Review, vol. 66, Nos. 7 and 8, 187–198, October 1 and 15, 1944. Summarizing the results of this article, if the magnetic field varies smoothly with the coordinate $x$ (indicated by numeral 5 in Figure 4), for example either as a linear function $H=H_0 x$, or as an exponential function $H=H_0 e^{bx}$, then the orbit of a charged particle is formally given by the integral.

$$y = \pm \int \frac{f\,dx}{(1-f^2)^{\frac{1}{2}}} \text{ where } f = a\int H_0(x)\,dx \quad (1)$$

The integral for $y$ may be evaluated for special forms of the function H, and we have done this for the linear and exponential forms mentioned above. Two types of orbits are in general obtained, one type being periodic in nature and one type being aperiodic.

In the case of a field having such one-dimensional (Cartesian) inhomogeneity of an exponential type as $H=H_0 e^{bx}$, the general equation for the periodic orbit is:

$$y = \pm \frac{1}{b}\left\{\sin^{-1}(+v\bar{c}) + \frac{\bar{c}}{(\bar{c}^2-1)^{\frac{1}{2}}}\sin^{-1}\left[\frac{1-\bar{c}^2-\bar{c}v}{v}\right]\right\}$$

where $$v = \frac{aH_0 e^{bx}}{b}, \quad a = \frac{1}{c}\left\{\frac{150e}{mV}\right\}^{\frac{1}{2}}$$

(2)

$\bar{c}$ is a constant to be adjusted to fit the solution to the proper starting conditions, $e$ is the charge of the ion in E. S. U., $c$ is the velocity of light in cm./sec., $m$ is the mass of the ion in grams, and $V$ is the energy of the ion in electron-volts.

Figure 5:
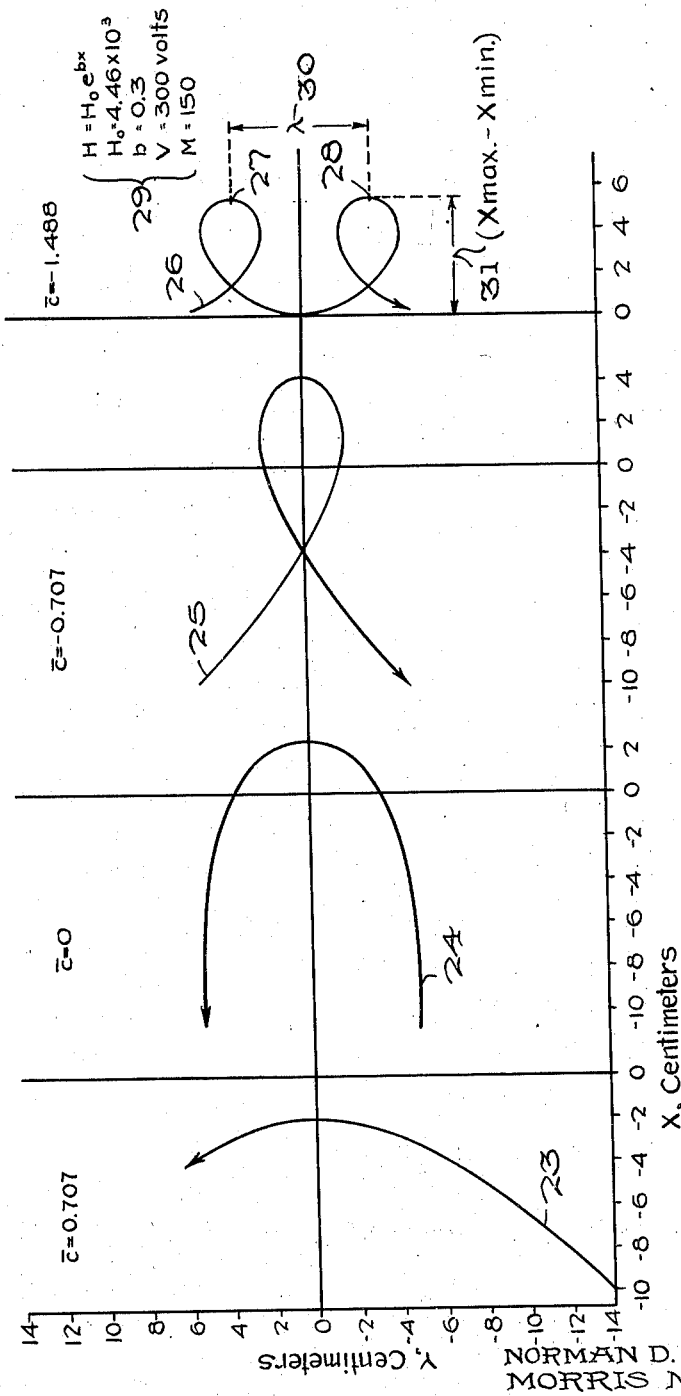
Figure 5 shows ion paths which may be obtained in a magnetic field having one-dimensional (Cartesian) inhomogeneity of an exponential type.

In Figure 5 we have plotted trajectories obtained by solutions of Equation 1. Orbit 26 is of the type given by Equation 2 above. When this orbit is applied to a mass spectrometer, the charged particle may be projected from point 27 in a direction parallel to the Y axis. The magnetic field is perpendicular to the figure, is invariant in the $y$ direction and varies as $H=H_0e^{bx}$ in the $x$ direction. Other constants of the orbit are given in the legend under numeral 29. A collector is placed at point 28 to catch the ions.

Figure 6:
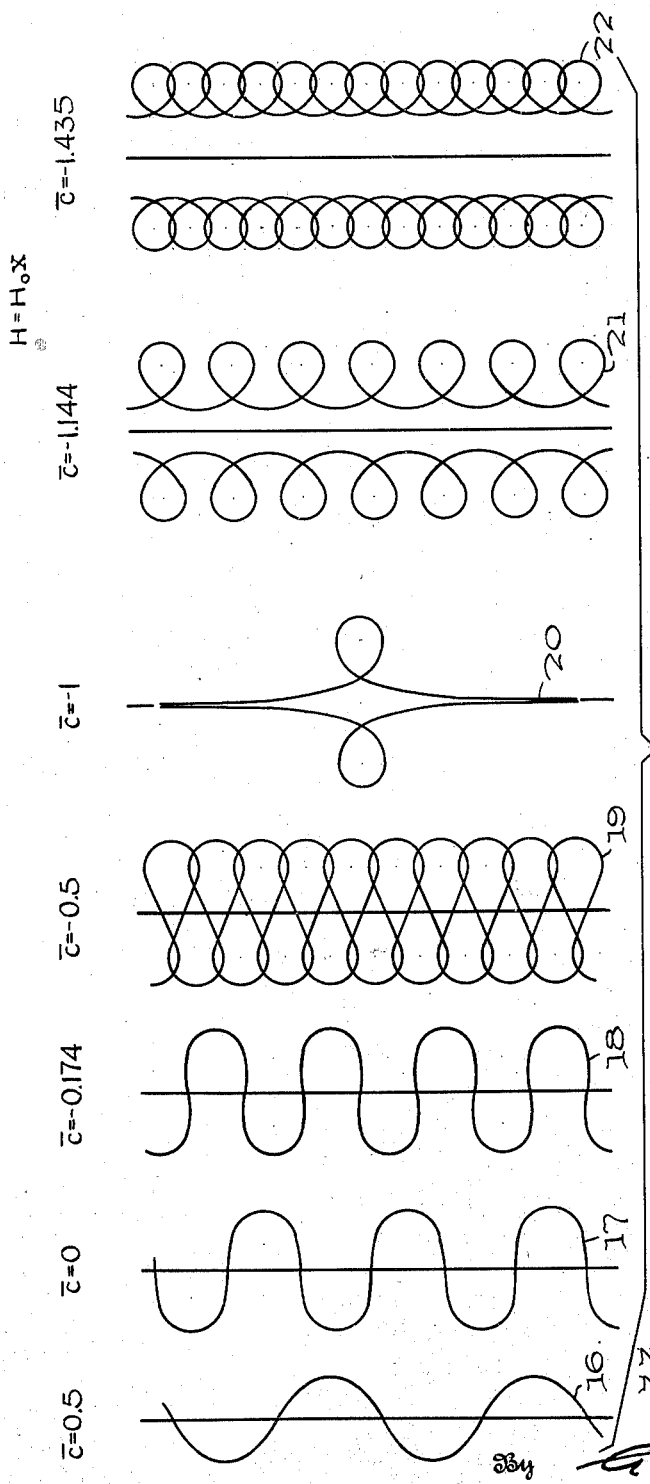
Figure 6 shows ion paths which may be obtained in a magnetic field having one-dimensional (Cartesian) inhomogeneity and having linear variation.

In Figure 6 we have illustrated various types of orbits obtainable when the magnetic field has the simple linear form $H=H_0x$. The orbits 16, 17, 18, 19, 20, 21 and 22 differ according to the integration constant $\bar{c}$ which depends on the starting conditions and which is stated above each orbit. The same is true of other orbits 23, 24, 25 and 26 obtainable in an exponential field as shown in Figure 5.

The orbits shown at 21 and 22 in Figure 6 are of a similar type as 26 in Figure 5, in that they have certain properties useful in space focusing of ion beams. As these orbits consist of repeated cycles of the same type of motion, we may ascribe to them a "wave length" $\lambda$ which we may define as the distance between geometrically similar points. Two such points are 27 and 28 of Figure 5, the $\lambda$ being indicated at 30. Another characteristic parameter of such an orbit is the total width in the $x$ direction, which we may call $(x_{max}-x_{min})$ and is indicated at 31. We have found that for such orbits $\lambda$ and $(x_{max}-x_{min})$ decrease with increasing $x$. A plot showing how $\lambda$ and $(x_{max}-x_{min})$ vary with $x_{max}$ in a particular instance is shown in Figure 7. The points of $x_{max}$ are the positions of smallest curvature of the orbits and the place where the orbits are also perpendicular to the X-axis. It is a result of the mathematical derivation leading to these orbits that $\lambda$ decreases as $x_{max}$ increases.

It is to be emphasized that it is always possible to obtain the periodic type of orbit similar to 26 (Figure 5) when the field H is a function of $x$ only and increases with increasing $x$. The fact that $\lambda$ for such orbits decreases for those orbits located in regions of stronger H is fundamental for the space focusing principle used in our invention.

Figure 8 is a schematic diagram of a mass spectrometer utilizing periodic orbits similar to 26 in Figure 5. In Figure 8 numeral 43 represents a conventional ion source in which gas molecules entering through inlet 32 are ionized by electron impact. Strong electric fields maintained between the slits inside the ion gun project the ions out through the exit slit 33. There is a considerable angular spread in the ion stream issuing from slit 33. The ion stream is further composed of ions having different mass/charge ratio, the relative numbers of which the analysis is to determine. A magnetic field is set up perpendicular to the plane of Figure 8 by means of a magnet (similar to Figure 3) such that the field increases in magnitude in the direction indicated by $x$ in Figure 8 in an exponential manner as $H=H_0e^{bx}$, and is invariant in the direction indicated by $y$ in Figure 8. Under the action of such a field the ion streams will be bent into the curved paths shown. Numerals 34, 35 and 36 each represent diverging beams of ions having different masses. A diaphragm 37 has a slit 38 narrow enough to allow only one beam of a single mass value to pass through and reach the ion collector. Thus all the ions in beam 39 after passing through slit 38 have the same mass. These are brought into convergence by the magnetic field and pass through a slit 42 and collected at 40 by an insulated ion collector or Faraday pail having a lead 41 to an amplifier and indicating apparatus in the conventional way. The various beams having different ion-mass are brought into the ion collector slit 42 either by adjusting the accelerating potentials in the ion gun or by adjusting the strength of the magnetic field. It is customary to measure the ion current collected by ion collector 40 as a function of one of the above parameters and the peaks on the resulting plot are proportional to the concentration of the various ions present in the ionized material in the ion source.

The arrangement of component parts in Figure 8 is such that the ion-source exit slit 33 corresponds to point 28 in Figure 5 and the collector entrance slit 42 corresponds to point 27 in Figure 5. The direction of movement of the particles is different in the two cases but this difference merely corresponds to a reversal of the direction of magnetic field. We have found that perfect focusing is obtained at 42 (Figure 8) in the sense that all the ions of a given mass and energy will enter a collector slit 42 no larger than the ion-source slit 33. This is because the ion-source opening 33 and the collector opening 42 are placed at points in the orbits corresponding to points 27 and 28 of Figure 5. Ions of the same mass and kinetic energy leaving either points 27 or 28 will arrive at either 28 or 27 in perfect focus in the above sense as a consequence of the fact that $(x_{max}-x_{min})$ decreases with increasing values of $x$.

Figure 9 illustrates in more detail the manner in which this angular focusing is achieved. Figure 9 is a schematic diagram of the geometrical configurations at the exit slits 44 and 45 of the ion source of an instrument such as shown in Figure 8, and also at the entrance slit 46 of the ion collector. In Figure 8 numeral 33 shows only one ion-source slit but two are commonly used in order to obtain some collimation of the ion beam. By proper distribution of potentials in the ion source, using well-known methods, the ions are caused to acquire essentially the same potential. The slits 44 and 45 (Figure 9) are at the same potential and are operative only in defining the emergent beam. Moreover, these slits are geometrically similar and located identically as regards the $x$ coordinate. With such an arrangement all ions leaving the exit slit will follow orbits having approximately the same radius of curvature at the exit slits, the orbits differing only in the angle of emergence. In Figure 9 the arrow 47 represents the orbit with the smallest value of $x_{max}$ that can emerge, 48 that with the largest value of $x_{max}$. The respective positions of $x_{max}$ for these orbits are indicated by points 53 and 54. These points will lie on a center line 52 midway between slits 44 and 45. Arrows 49 and 50 represent the paths of greatest divergence in angle of emergence. Since slits 44 and 45 cover the same range along the $x$ direction, orbits 49 and 50 will have the same $x_{max}$.

Consider now the orbits 47, 48, 49 and 50 when the ions have advanced by exactly one wave length in their periodic paths. The collector slit 46 is displaced from source slit 44 by one wave length $\lambda$. To clarify the geometry we may introduce a phantom collector slit 51 displaced from 45 by $\lambda$. A center line 53 is also shown displaced from center line 52 by $\lambda$. Since orbits 49 and 50 have the same $x_{max}$, they will have the same $\lambda$. Therefore, a slit 46 of the same width as 44 and located at the same value of $x$, but displaced along $y$ by a pre-chosen value $\lambda$, will collect both 49 and 50. That is, orbits 49 and 50 will pass through slit 46 with exactly the same geometry as they pass through slit 44. Thus this arrangement of orbits and slits will provide perfect angular focusing in that diverging rays leaving the ion source will converge within collector slits no wider than the source slits. Furthermore since orbit 47 has a smaller value of $x_{max}$, and hence slightly larger $\lambda$, it will be displaced slightly upwards relative to 49 and 50 in the region of slit 46. Thus its new $x_{max}$ at point 55 is displaced upward from the center line 53 a small amount as $\Delta\lambda$ and this permits it to easily clear the edge of slit 46. Conversely, as orbit 48 has a larger value of $x_{max}$, its $\lambda$ will be smaller than that of 49 and 50. Hence as it passes through slit 46 its new position of $x_{max}$ at point 56 will be displaced slightly downward from the center line 53 a small amount shown as $\Delta\lambda$ and this permits this orbit also to clear the edge of slit 46.

This shifting of the orbits 47 and 48 relative to 49 and 50 means that the latter will limit the lateral spread in the ion beam when entering collector slit 46 just as they define the angular spread in the beam emerging from the source slits 44 and 45. We thus have the condition for perfect space focusing satisfied, in the sense that if we control the momentum spread closely enough all the ions of a certain momentum leaving the exit slits will be collected by the collector slits. The phantom slit 51 shown in the Figure 9 bears the same relationship to 46 as 45 does to 44. It is shown in Figure 9 only for the sake of clarity, and there will be no such slit in the actual collector.

The $\lambda$ chosen for operation is entirely arbitrary, and ions of any mass can be collected as desired by varying either the magnetic field or the accelerating potential, or both. Since the voltage spread in the ion source can be closely controlled, there will emerge from the ion source only definite classes of ion beams, each class characterized by a definite mass. These different classes cannot have the sme orbits, and there will be an increasing divergence between the different orbits as they proceed into regions of smaller $x$. This spread will be at a maximum at the position of the diaphragm 37 shown in Figure 8. The slit 38 (Figure 8) serves to separate the ions as regards mass. The three orbits shown for each class illustrate a typical spread caused by divergence at the exit slit, plus some spread in momentum.

While we have described in Figures 8 and 9 how our method of angular focusing operates when a magnetic field is used having one-dimensional (Cartesian) inhomogeneity of an exponential form as $H = H_0 e^{bx}$, the same effect takes place for a one-dimensional (Cartesian) inhomogeneity of a linear form. This focusing effect takes place in any form of field variation in which a periodic orbit is obtained.

It is further possible to obtain such focusing by employing periodic orbits in a field having axial symmetry. In such cases the field $H$ is a function of the radial distance $r$ from the axis of symmetry, such a function being $$H = \frac{H_0}{r^{n+1}}$$

for example, where $n$ is a positive number. The orbit in polar coordinates is formally given by the integral:

$$\theta = \pm \int \left\{ \frac{aH_0}{(1-n)r^{n+1}} + \frac{\overline{c}}{r^2} \right\} \left[ 1 - \left\{ \frac{aH_0}{(1-n)r^n} + \frac{\overline{c}}{r} \right\}^2 \right]^{-\frac{1}{2}} \cdot dr \quad (3)$$

We have determined some of these orbits by numerical integration of Equation 3. A periodic orbit of this type is illustrated in Figure 10. The magnetic field is directed normal to Figure 10 and is axially symmetrical about the center point P at 61. The radial scale is indicated by the circles 64. Under proper conditions a charged particle projected at a point 60 in the plane of Figure 10, and normal to a radius from P will execute the periodic orbit shown. On such an orbit, points 62 and 63 are points of nearest approach to the axis and the path at these points is again normal to a radius.

Figure 11 shows how periodic orbits in an axially symmetrical field may be used for angular focusing in a mass spectrometer. The magnetic field is normal to Figure 11 and has its axis of symmetry at point 65. The ion gun at 66 with its exit slit 67 is located so as to project the ions approximately normal to the radius vector whereupon they execute the orbits shown. The divergent beams are sorted by the magnetic field, and only the beam 70 having a desired mass passes through the slit 68 in diaphragm 69. Due to geometrical conditions similar to those described with respect to Figure 9, the divergent beam 70 will again be brought to a focus at the collector slit 71 and the intensity of the beam having this particular mass value may be measured by the ion current in lead 72.

Momentum focusing previously referred to is produced by the use of aperiodic orbits similar to 24 of Figure 5. These are of a special type obtained, for instance, when the magnetic field varies exponentially with $x$, that is $H = H_0^{bx}$. The general equation of this type of orbit is found to be:

$$y = \pm \frac{1}{b} \sin^{-1}\left\{\frac{aH_0}{b} e^{bx}\right\} \quad (4)$$

Physically this type of orbit may be described as one traced out by an ion which is projected parallel to the X-axis and from a point of weak $H$. Mathematically, it corresponds to an ion or electron starting from $x = -\infty$. Physically, this is not necessary, and it suffices if the orbits begin at values of $x$ such that the magnetic field is negligibly weak. These orbits all start out in a direction parallel to the X-axis, make one half-turn, and return to the region of weak $H$ along a path that is asymptotic to a line parallel to the X-axis. Physically, this means that after the ion has returned from regions of higher $H$, its direction is essentially parallel to the X-axis. The unique result which we utilize is predicted by the above Equation 4 defining these orbits, namely that the separation in the $y$ direction between the line of approach and the line of departure depends only on the constant $b$, which determines the rapidity of growth of $H$ in the equation: $H = H_0^{bx}$.

Figure 13:
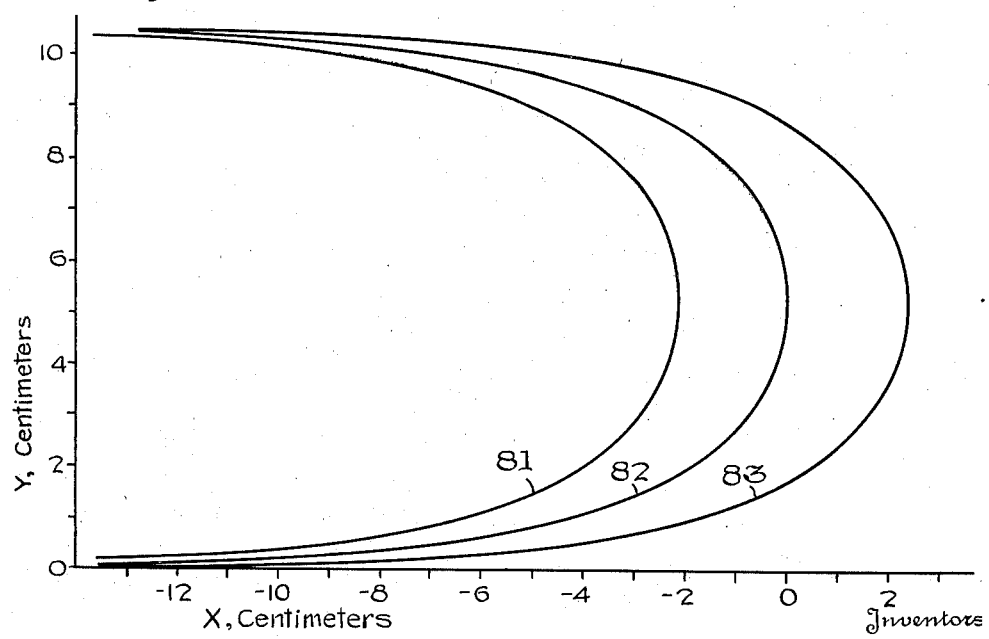
Figure 13 shows ion paths of a special type which may be obtained in the exponential field of Figure 12.

Hence, all ions that are projected into regions of increasing $H$ from a region of very weak $H$, and in a direction parallel to the X-axis, will turn and recede, all passing through essentially the same point, which is displaced in the $y$ direction by a distance of $\pi/b$. The depth of penetration of the ion into the region of increasing values of $x$ will depend upon its momentum. This is illustrated by Figure 13 in which we have drawn the calculated paths for ions of atomic mass 1, 35, and 150, all with 300 electron volt energy, in a field defined by: $H = 4.46 \times 10^3 \times e^{0.3x}$.

Figure 12:
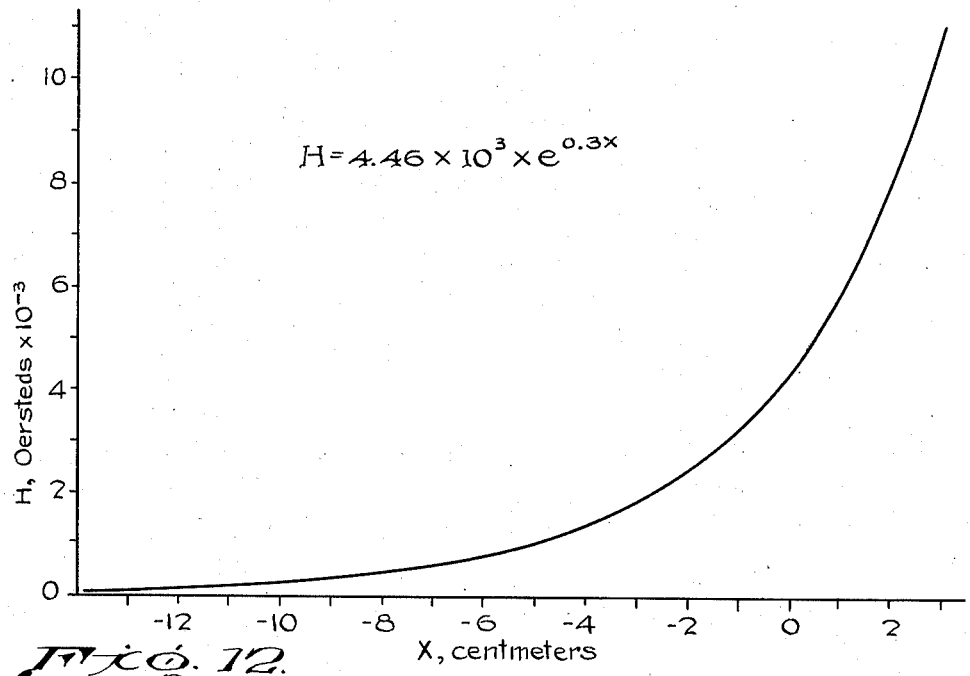
Figure 12 is a graph showing the intensity of a magnetic field having one-dimensional (Cartesian) inhomogeneity of an exponential type.

Figure 12 shows a graph of the intensity of a magnetic field of the above form, specifically $H = 4.46 \times 10^3 \times e^{0.3x}$. The field is invariant in the $y$ direction. Figure 13 shows the calculated aperiodic orbits in such a field, the three orbits 81 and 82 and 83 being for ions of mass 1, 35 and 150 respectively, each having an energy of 300 electron-volts. These orbits have the property of separating and reuniting beams of ions originally starting from the same point in essentially the same direction but with different momenta. This is what we have termed momentum focusing. The manner in which the ions of greater mass penetrate to higher values of field strength is seen by comparing Figures 12 and 13.

Figure 14 shows an instrument employing such aperiodic orbits and achieving momentum focusing. An instrument employing these aperiodic orbits will evidently provide momentum focusing. The magnetic field is directed perpendicular to the plane of Figure 14, increases exponentially in the manner of Figure 12 in the direction indicated as $x$ (i. e. toward the right) and is invariant in the direction indicated as $y$. The ion source 85 will employ a fine slit system 86 which will project the ions in the $x$ direction of increasing H. The emerging beam 87 will have a negligible angular spread. The spread of the ion bundles as they approach their points of greatest penetration in the $x$-direction is due to the spread of momentum. We have shown in Figure 14 ion beams 88, 89 and 90 of three different masses. The spread or broadening of beam 89 for instance is due to slight momentum variations among ions having the same mass. The desired beam is allowed to pass through a slit 91 in diaphragm 92. As a consequence of the form of the aperiodic orbits the particles constituting beam 89 subsequently again converge and enter the collector slit 109 where they are caught on the ion collector 93 and measured in the conventional manner.

Such a mass spectrometer or beta-ray spectrometer as Figure 14 is especially valuable in an application where it is difficult to keep the energy of the emerging ions within small tolerances. These cases arise where it is desired to collect ions or electrons over a wide region between accelerating electrodes or when the ions are created with large differences in kinetic energy. As the charged particles may originate from different places between the electrodes, their total potential will vary. Such an instrument is particularly valuable when used to study photoionization, in which application it is desirable to collect the ions over an extended region to gain greater intensity in the ion beam.

A similar type of aperiodic orbit useful for momentum focusing may be obtained in the axially symmetrical field previously referred to in connection with Figure 10. The general equation of the aperiodic orbit in such a field where $$H = \frac{H_0}{r^{n+1}}$$

and $n$ is a positive number greater than unity, is:

$$\theta = \pm \frac{1}{n} \sin^{-1}\left\{\frac{aH_0}{(1-n)r^n}\right\}$$

Figure 15 illustrates three such orbits 94, 95 and 96 which result when ions are initially projected radially into a field directed normal to the plane of Figure 15 and whose value is $$H = \frac{H_0}{r^{n+1}}$$

where $r$ is the distance from the axis of symmetry P at point 97. The ions reach a point of minimum $r$ and finally return in a direction which is asymptotic to a radius vector displaced by an angle $\theta$ from the radius vector of approach. The angular separation 110 will be $\pi/n$ and is independent of the momentum of the individual ions. Ions having different momenta penetrate the field to different distances, but all entering the field along a common radius as 98 also leave along another common radius as 99.

In Figure 16 we have shown diagrammatically an instrument utilizing the aperiodic orbits of Figure 15 to produce momentum focusing. The magnetic field used is directed perpendicular to the plane of Figure 16 and its intensity has axial symmetry similar to that of Figure 15. The ion source 100 produces a very narrow beam 101 directed at the axis of symmetry of the magnetic field. The spreading of the beam 101 results from momentum variations. Three mass groups 102, 103 and 104 are shown, each spread slightly due to momentum inhomogeneity. The desired beam is obtained through slit 105 in the diaphragm 106 and the ions which pass are reunited as a consequence of the form of the orbits at the collector slits 107 and enter the collector 108 whose ion current may be measured or recorded in a conventional manner. Momentum focusing is thus achieved in this instrument.

In the instruments illustrated by Figures 14 and 16, the ion sorting or choice of the desired mass ion to be collected is made by the diaphragm slits 91 and 105 respectively. The desired beam may be brought to traverse the slit by changing either the accelerating potential in the ion-source, or the strength of the magnetic field, or the position of the sorting slit. The ability to sort the ions by simply moving the slit 91 or 105 without moving either the source or collector is peculiar to the instruments of Figures 14 and 16 and is of great advantage. It is difficult to vary the magnetic field and still maintain its exact form. It is also difficult to apply a series of accelerating voltages to the ion-source without causing distortion which changes the angular spread of the beam and also without introducing electrical interference in associated apparatus. By the use of our invention the sorting may be done by placing mechanically controlled shutters on one or more sorting slits such as 91 and 105 of instruments Figures 14 and 16. This makes it possible to measure all ions in beams which fall within any desired momentum range by widening the slits 91 and 105. It is also possible to select two distinct momentum ranges and measure the total number of ions in either one in sequence or in both at once. By placing a series of mechanically controlled shutters on the diaphragm 92 (Figure 14) or on the diaphragm 106 (Figure 16) it is possible to obtain a sequence of signals on the collector of any desired frequency or order of succession. The ability to obtain such a sequence by mechanical operations only is of great value in analytical application of the mass spectrometer.

While we have diagrammatically shown the instrument with a gas inlet, our invention is not restricted to the examination of gaseous materials. The invention encompasses all types of mass spectrometers, including those in which the material to be studied may be volatilized in the ion source itself, for instance by means of a furnace.

We have described our invention as applied to focusing of ion beams but the invention includes also similar application to other charged particles such as electrons, positrons, etc.

The method of obtaining the uniformly directed non-homogeneous magnetic field employed in our invention is further not to be restricted to the type of pole pieces shown in Figures 3 and 4 but these are for illustration only. Any known method of obtaining a magnetic field of the desired form may be used, including permanent magnets or current-carrying coils having non-ferrous cores.

The term "uniform," as applied to a magnetic field, is herein meant to imply uniority in direction, while the term "homogeneous" is meant to imply homogeneity in intensity. Inasmuch as a magnetic field is a vector quantity, both direction and magnitude characteristics are specified. The magnetic fields utilized by our invention are described as uniform in direction and by this is meant uniformity within practical limitations. We have defined the magnetic field intensity perpendicular to the plane MM' (Fig. 4) and for purposes of clarity have illustrated in the plane MM' the trajectories of orbits used, but this is not to be construed as a limitation. Extension of the apparatus so as to have practical thickness above and below the plane MM' with maintenance of the appropriate parameters within practical limitations is to be included in the scope of our invention. We have furthermore herein referred to planar orbits but this also is not to be limited to the strict mathematical interpretation, but is to be interpreted within practical limitations and attainments.

What we claim as our invention is:

1. A mass spectrometer or the like comprising means for producing a region having a substantially uniformly directed magnetic field whose intensity varies in a manner to impart to a moving charged particle therein an open orbit having spatial periodicity, a source of moving charged particles, a collector of charged particles and a perforated diaphragm, said source and said collector being located in said field at successive points of maximum field strength along a spatially periodic planar open orbit for the desired particles, and said diaphragm being located transverse to the orbit of the charged particles moving between said source and said collector and with its opening positioned on the orbit of the desired particles.

2. A mass spectrometer or the like comprising means for producing a region having a substantially uniformly directed magnetic field whose intensity perpendicular to a normal plane is invariant with one Cartesian coordinate in said plane and varies in a monotonic manner with the other coordinate in said plane, a source of moving charged particles, a collector of charged particles and a perforated diaphragm, said source and said collector being located in said field at successive points of maximum field strength along a spatially periodic planar orbit for the desired particles, and said diaphragm being located transverse to the orbit of the charged particles moving between said source and said collector and with its opening positioned on the orbit of the desired particles.

3. A mass spectrometer or the like comprising means for producing a region having a substantially uniformly directed magnetic field whose intensity perpendicular to a normal plane is invariant with one Cartesian coordinate in said plane and varies linearly with the other coordinate in said plane, a source of moving charged particles, a collector of charged particles and a perforated diaphragm, said source and said collector being located in said field at successive points of maximum field strength along a spatially periodic planar orbit for the desired particles, and said diaphragm being located transverse to the orbit of the charged particles moving between said source and said collector and with its opening positioned on the orbit of the desired particles.

4. A mass spectrometer or the like comprising means for producing a region having a substantially uniformly directed magnetic field whose intensity perpendicular to a normal plane is invariant with one Cartesian coordinate in said plane and varies exponentially with the other coordinate in said plane, a source of moving charged particles, a collector of charged particles and a perforated diaphragm, said source and said collector being located in said field at successive points of maximum field strength along a spatially periodic planar orbit for the desired particles, and said diaphragm being located transverse to the orbit of the charged particles moving between said source and said collector and with its opening positioned on the orbit of the desired particles.

5. A mass spectrometer or the like comprising means for producing a region having a substantially uniformly directed magnetic field whose intensity perpendicular to a normal plane decreases monotonically with the radial distance from an axis of symmetry, a source of moving charged particles, a collector of charged particles, and a perforated diaphragm, said source and said collector being located in said field at successive points of maximum field strength along a planar orbit which for the desired particles is spatially periodic with respect to polar coordinates, and said diaphragm being located transverse to the orbit of the charged particles moving between said source and said collector and with its opening positioned on the orbit of the desired particles.

6. A mass spectrometer or the like comprising means for producing a region having a substantially uniformly directed magnetic field which varies spatially in a monotonic manner, a source of substantially uniformly directed charged particles, a collector of charged particles and a perforated diaphragm, said source projecting charged particles into said field in the direction of maximum positive field strength gradient, said collector facing in the direction of maximum positive field strength gradient and laterally displaced from said source by the amount of lateral orbital deflection undergone by the charged particles from said source, and said diaphragm being located transverse to the orbit of the charged particles moving between said source and said collector and with its opening positioned on the orbit of particles to be collected.

7. A mass spectrometer or the like comprising means for producing a region having a substantially uniformly directed magnetic field whose intensity perpendicular to a normal plane is invariant with one Cartesian coordinate in said plane and varies in a monotonic manner with the other coordinate in said plane, a source of substantially uniformly directed charged particles, a collector of charged particles and a perforated diaphragm, said source projecting charged particles into said field in the direction of maximum positive field strength gradient, said collector facing in the direction of maximum positive field strength gradient and laterally displaced from said source by the amount of lateral orbital deflection undergone by the charged particles from said source, and said diaphragm being located transverse to the orbit of the charged particles moving between said source and said collector and with its opening positioned on the orbit of particles to be collected.

8. A mass spectrometer or the like comprising means for producing a region having a substantially uniformly directed magnetic field whose intensity perpendicular to a normal plane is invariant with one Cartesian coordinate in said plane and varies exponentially with the other coordinate in said plane, a source of substantially uniformly directed charged particles, a collector of charged particles and a perforated diaphragm, said source projecting charged particles into said field in the direction of maximum positive field strength gradient, said collector facing in the direction of maximum positive field strength gradient and laterally displaced from said source by the amount of lateral orbital deflection undergone by the charged particles from said source, and said diaphragm being located transverse to the orbit of the charged particles moving between said source and said collector and with its opening positioned on the orbit of particles to be collected.

9. A mass spectrometer or the like comprising means for producing a region having a substantially uniformly directed magnetic field whose intensity perpendicular to a normal plane decreases monotonically with the radial distance from an axis of symmetry, a source of substantially uniformly directed charged particles, a collector of charged particles and a perforated diaphragm, said source projecting charged particles into said field in the direction of maximum positive field strength gradient, said collector facing in the direction of maximum positive field strength gradient and displaced from said source angularly about said axis of symmetry by the amount of angular orbital deflection undergone by the charged particles from said source, and said diaphragm being located transverse to the orbit of the charged particles moving between said source and said collector and with its opening positioned on the orbit of particles to be collected.

10. A mass spectrometer or the like comprising means for producing a region having a substantially uniformly directed magnetic field which varies spatially in a monotonic manner, a source of substantially uniformly directed charged particles, a collector of charged particles and a diaphragm having a movable opening therein, said source projecting charged particles into said field in the direction of maximum positive field strength gradient, said collector facing in the direction of maximum positive field strength gradient and laterally displaced from said source by the amount of orbital deflection undergone by the charged particles from said source whereby said collector may collect particles of different momenta, and said diaphragm being located transverse to the orbit of the charged particles moving between said source and said collector and with its opening positioned on the orbit of particles of desired momentum and means for adjusting the location of said opening in said diaphragm.

11. A mass spectrometer or the like comprising means for producing a region having a substantially uniformly directed magnetic field whose intensity perpendicular to a normal plane is invariant with one Cartesian coordinate in said plane and varies in a monotonic manner with the other coordinate in said plane, a source of substantially uniformly directed charged particles, a collector of charged particles and a diaphragm having a movable opening therein, said source projecting charged particles into said field in the direction of maximum positive field strength gradient, said collector facing in the direction of maximum positive field strength gradient and laterally displaced from said source by the amount of orbital deflection undergone by the charged particles from said source whereby said collector may collect particles of different momenta, and said diaphragm being located transverse to the orbit of the charged particles moving between said source and said collector and with its opening positioned on the orbit of particles of desired momentum, and means for adjusting the location of said opening in said diaphragm.

12. A mass spectrometer or the like comprising means for producing a region having a substantially uniformly directed magnetic field whose intensity perpendicular to a normal plane is invariant with one Cartesian coordinate in said plane and varies exponentially with the other coordinate in said plane, a source of substantially uniformly directed charged particles, a collector of charged particles and a diaphragm having a movable opening therein, said source projecting charged particles into said field in the direction of maximum positive field strength gradient, said collector facing in the direction of maximum positive field strength gradient and laterally displaced from said source by the amount of orbital deflection undergone by the charged particles from said source whereby said collector may collect particles of different momenta, and said diaphragm being located transverse to the orbit of the charged particles moving between said source and said collector and with its opening positioned on the orbit of particles of desired momentum and means for adjusting the location of said opening in said diaphragm.

13. A mass spectrometer or the like comprising means for producing a region having a substantially uniformly directed magnetic field whose intensity perpendicular to a normal plane decreases monotonically with the radial distance from an axis of symmetry, a source of substantially uniformly directed charged particles, a collector of charged particles and a diaphragm having a movable opening therein, said source projecting charged particles into said field in a radial direction toward the axis of symmetry, said collector facing said axis of symmetry and displaced from said source angularly about said axis of symmetry by the amount of orbital deflection undergone by the charged particles from said source whereby said collector may collect particles of different momenta, said diaphragm being located transverse to the orbit of the charged particles moving between said source and said collector and with its opening positioned on the orbit of particles of desired momenta, and means for adjusting the location of said opening in said diaphragm.

14. A method of focusing moving charged particles in a mass spectrometer or the like which comprises projecting the moving charged particles in the direction of maximum positive field strength gradient into a substantially uniformly directed magnetic field which varies spatially in a monotonic manner and collecting the particles at a point common to orbits of charged particles having different momenta.

15. A method of focusing moving charged particles in a mass spectrometer or the like which comprises projecting the moving charged particles in the direction of maximum positive field strength gradient into a substantially uniformly directed magnetic field whose intensity perpendicular to a normal plane is invariant in one Cartesian coordinate in said plane and varies in a monotonic manner with the other coordinate in said plane and collecting the particles at a point common to orbits of charged particles having different momenta.

16. A method of focusing moving charged particles in a mass spectrometer or the like which comprises projecting the moving charged particles in the direction of maximum positive field strength gradient into a substantially uniformly directed magnetic field whose intensity perpendicular to a normal plane is invariant in one Cartesian coordinate in said plane and varies exponentially with the other coordinate in said plane and collecting the particles at a point common to orbits of charged particles having different momenta.

17. A method of focusing moving charged particles in a mass spectrometer or the like which comprises projecting the moving charged particles in the direction of maximum positive field strength gradient into a substantially uniformly directed magnetic field whose intensity perpendicular to a normal plane decreases monotonically with the radial distance from an axis of symmetry and collecting the particles at a point common to orbits of charged particles having different momenta.

18. A method of sorting moving charged particles in a mass spectrometer or the like which comprises projecting the moving charged particles in the direction of maximum positive field strength gradient into a substantially uniformly directed magnetic field which varies spatially in a monotonic manner, collecting the desired particles at a point common to orbits of charged particles having different momenta and obstructing the motion of undesired particles.

19. A method of sorting moving charged particles in a mass spectrometer or the like which comprises projecting the moving charged particles in the direction of maximum positive field strength gradient into a substantially uniformly directed magnetic field whose intensity perpendicular to a normal plane is invariant with one Cartesian coordinate in said plane and varies in a monotonic manner with the other coordinate in said plane, collecting the desired particles at a point common to the orbits of charged particles having different momenta and obstructing the motion of undesired particles.

20. A method of sorting moving charged particles in a mass spectrometer or the like which comprises projecting the moving charged particles in the direction of maximum positive field strength gradient into a substantially uniformly directed magnetic field whose intensity perpendicular to a normal plane is invariant with one Cartesian coordinate in said plane and varies exponentially with the other coordinate in said plane, collecting the desired particles at a point common to the orbits of charged particles having different momenta and obstructing the motion of undesired particles.

21. A method of sorting moving charged particles in a mass spectrometer or the like which comprises projecting the moving charged particles in the direction of maximum positive field strength gradient into a substantially uniformly directed magnetic field whose intensity perpendicular to a normal plane varies monotonically with the radial distance from an axis of symmetry, collecting the desired particles at a point common to orbits of charged particles having different momenta and obstructing the motion of undesired particles.

22. A method of focusing moving charged particles by means of a magnetic field in a mass spectrometer or the like which comprises generating a substantially uniformly directed magnetic field whose intensity varies in such manner that the charged particles execute trochoid-like open orbits having spatial periodicity, launching the moving charged particles in the field in a direction substantially perpendicular to the field at a point of farthest penetration into the field along the orbit and collecting the particles at a point on the orbit which is an integral spatial period from the source.

23. A method of focusing moving charged particles by means of a magnetic field in a mass spectrometer or the like which comprises generating a substantially uniformly directed magnetic field whose intensity perpendicular to the normal plane is invariant with one Cartesian coordinate in said plane and varies in a monotonic manner with the other coordinate in said plane whereby the charged particles will execute trochoid-like open orbits having spatial periodicity, launching the moving charged particles in the field in a direction substantially perpendicular to the field at a point of farthest penetration into the field along the orbit and collecting the particles at a point on the orbit which is an integral spatial period from the source.

24. A method of focusing moving charged particles by means of a magnetic field in a mass spectrometer or the like which comprises generating a substantially uniformly directed magnetic field whose intensity perpendicular to the normal plane is invariant with one Cartesian coordinate in said plane and varies linearly with the other coordinate in said plane whereby the charged particles will execute trochoid-like open orbits having spatial periodicity, launching the moving charged particles in the field in a direction substantially perpendicular to the field at a point of farthest penetration into the field along the orbit and collecting the particles at a point on the orbit which is an integral spatial period from the source.

25. A method of focusing moving charged particles by means of a magnetic field in a mass spectrometer or the like which comprises generating a substantially uniformly directed magnetic field whose intensity perpendicular to the normal plane is invariant with one Cartesian coordinate in said plane and varies exponentially with the other coordinate in said plane whereby the charged particles will execute trochoid-like open orbits having spatial periodicity, launching the moving charged particles in the field in a direction substantially perpendicular to the field at a point of farthest penetration into the field along the orbit and collecting the particles at a point on the orbit which is an integral spatial period from the source.

26. A method of focusing moving charged particles by means of a magnetic field in a mass spectrometer or the like which comprises generating a substantially uniformly directed magnetic field whose intensity perpendicular to a normal plane decreases monotonically with the radial distance from an axis of symmetry whereby the charged particles will execute trochoid-like open orbits which are spatially periodic with respect to polar coordinates, launching the moving charged particles in the field in a direction substantially perpendicular to the field at a point of farthest penetration into the field along the orbit and collecting the particles at a point on the orbit which is an integral spatial period from the source.

NORMAN D. COGGESHALL.
MORRIS MUSKAT.

REFERENCES CITED

The following references are of record in the file of this patent:

UNITED STATES PATENTS

| Number | Name | Date |
|---|---|---|
| 2,221,467 | Bleakney | Nov. 12, 1940 |
| 2,297,305 | Kerst | Sept. 29, 1942 |

OTHER REFERENCES

Tech. pub. entitled Positive-ray analysis of potassium, calcium and zinc, by A. J. Dempster, in Physical Review, 2d series, vol. 20, 1922, pages 631–638.

Tech. pub. entitled The mass-spectrograph and its uses, by Walter Bleakney, in American Physics Teacher, Feb. 1936, vol. 4, pp. 12–23.

Tech. pub. entitled Mass spectrum analysis, in Physical Review, Aug. 15, 1936, vol. 50, pages 282–296.

Certificate of Correction

May 31, 1949.

Patent No. 2,471,935.

NORMAN D. COGGESHALL ET AL.

It is hereby certified that errors appear in the printed specification of the above numbered patent requiring correction as follows:

Column 2, line 13, for the words "of an" read *of any*; lines 51 and 52, for "obtianed" read *obtained*; column 4, line 34, strike out "different momentum in the beam to travel in dif-"; line 36, for "diffrent" read *different*; column 6, line 60, for that portion of the equation reading "$(+v\bar{c})$" read $(v+\bar{c})$; column 9, line 42, for "sme" read *same*; column 13, line 11, for "unifority" read *uniformity*;

and that the said Letters Patent should be read with these corrections therein that the same may conform to the record of the case in the Patent Office.

Signed and sealed this 18th day of October, A. D. 1949.

[SEAL]

THOMAS F. MURPHY,
*Assistant Commissioner of Patents.*